(12) United States Patent
Apostolatos et al.

(10) Patent No.: US 12,079,352 B2
(45) Date of Patent: Sep. 3, 2024

(54) ENFORCING DATA SECURITY CONSTRAINTS IN A DATA PIPELINE

(71) Applicant: Palantir Technologies Inc., Palo Alto, CA (US)

(72) Inventors: Anton Apostolatos, Boston, MA (US); Adam Lieskovský, Baar (CH); Florian Diegruber, Munich (DE); Francisco Ferreira, Zurich (CH); Joseph Kane, Munich (DE); Joanna Peller, London (GB); Kelvin Lau, Fairfield (AU); Maciej Laska, Warsaw (PL); Mikael Ibrahim Mofarrej, Munich (DE); Max-Philipp Schrader, Germering (DE); Philipp Hoefer, Munich (DE); Spencer McCollester, London (GB); Viktor Nordling, Watson (AU)

(73) Assignee: Palantir Technologies Inc., Denver, CO (US)

( * ) Notice: Subject to any disclaimer, the term of this patent is extended or adjusted under 35 U.S.C. 154(b) by 462 days.

(21) Appl. No.: 17/226,014

(22) Filed: Apr. 8, 2021

(65) Prior Publication Data

US 2022/0198032 A1    Jun. 23, 2022

(30) Foreign Application Priority Data

Dec. 18, 2020  (GB) ...................................... 2020155

(51) Int. Cl.
*G06F 21/60* (2013.01)
*G06F 16/25* (2019.01)

(52) U.S. Cl.
CPC .......... *G06F 21/604* (2013.01); *G06F 16/258* (2019.01)

(58) Field of Classification Search
CPC .. G06F 21/604; G06F 16/258; G06F 21/6227; G06F 21/6245
See application file for complete search history.

(56) References Cited

U.S. PATENT DOCUMENTS 7,620,665 B1 * 11/2009 George ................ G06F 16/214
11,269,876 B1 * 3/2022 Basavaiah ............... G06F 8/77
(Continued)

OTHER PUBLICATIONS

Extended European Search Report dated Sep. 23, 2021, issued in related European Patent Application No. 21167475.9 (11 pages).

*Primary Examiner* — Harunur Rashid
(74) *Attorney, Agent, or Firm* — Sheppard Mullin Richter & Hampton LLP

(57) ABSTRACT

A computer-implemented method enforces data security constraints in a data pipeline. The data pipeline takes one or more source datasets as input and performs one or more data transformations on them. The method includes using data defining one or more data security constraints to configure the data pipeline to perform a data transformation on a restricted subset of entries of the source datasets. The restriction is defined by the data defining one or more data security constraints. The method further includes performing the data transformation according to the configuration to produce one or more transformed datasets. The method further includes using the data defining one or more data security constraints to perform a verification on one or more of the transformed datasets to ensure that entries in the one or more of the transformed datasets are restricted as defined by the one or more data security constraints.

18 Claims, 7 Drawing Sheets

(56) References Cited

U.S. PATENT DOCUMENTS

| | | | |
|---|---|---|---|
| 2007/0260602 A1* | 11/2007 | Taylor | H04L 63/0245 |
| 2008/0229428 A1* | 9/2008 | Camiel | G06F 16/122 |
| | | | 707/E17.01 |
| 2018/0293283 A1* | 10/2018 | Litoiu | G06F 16/2465 |
| 2020/0012584 A1* | 1/2020 | Walters | G06F 21/6254 |
| 2020/0019558 A1* | 1/2020 | Okorafor | G06F 21/6254 |
| 2020/0311294 A1* | 10/2020 | Sim-Tang | G06F 16/1774 |
| 2022/0121689 A1* | 4/2022 | James | G06F 16/24568 |

* cited by examiner

ENFORCING DATA SECURITY CONSTRAINTS IN A DATA PIPELINE

CROSS REFERENCE TO RELATED APPLICATIONS

This application claims priority to United Kingdom Application Number 2020155.4, filed Dec. 18, 2020, the content of which is incorporated to the present disclosure by reference.

TECHNICAL FIELD

The present disclosure pertains to data pipelines, also known as data processing pipelines.

BACKGROUND

A data pipeline system is a collection of computer software scripts and programs, executed on computer hardware, that is capable of generating one or more transformed datasets from one or more source datasets. A data pipeline system can construct one or more pipeline stages that may depend on each other in accordance with user-specified instructions or schemas, and then process the source datasets through the pipeline stages. Such processing involves transforming data of the source datasets to produce the transformed datasets: for instance, two or more datasets may be joined to produce a new dataset. Data pipelines find use in many fields of application thanks to their ability to transform large amounts of data in an automatic and computationally efficient manner, while providing the flexibility of being able to continue processing datasets even as new data is added to them.

SUMMARY

Embodiments of the specification are recited in the appended claims.

DETAILED DESCRIPTION

Figure 1:
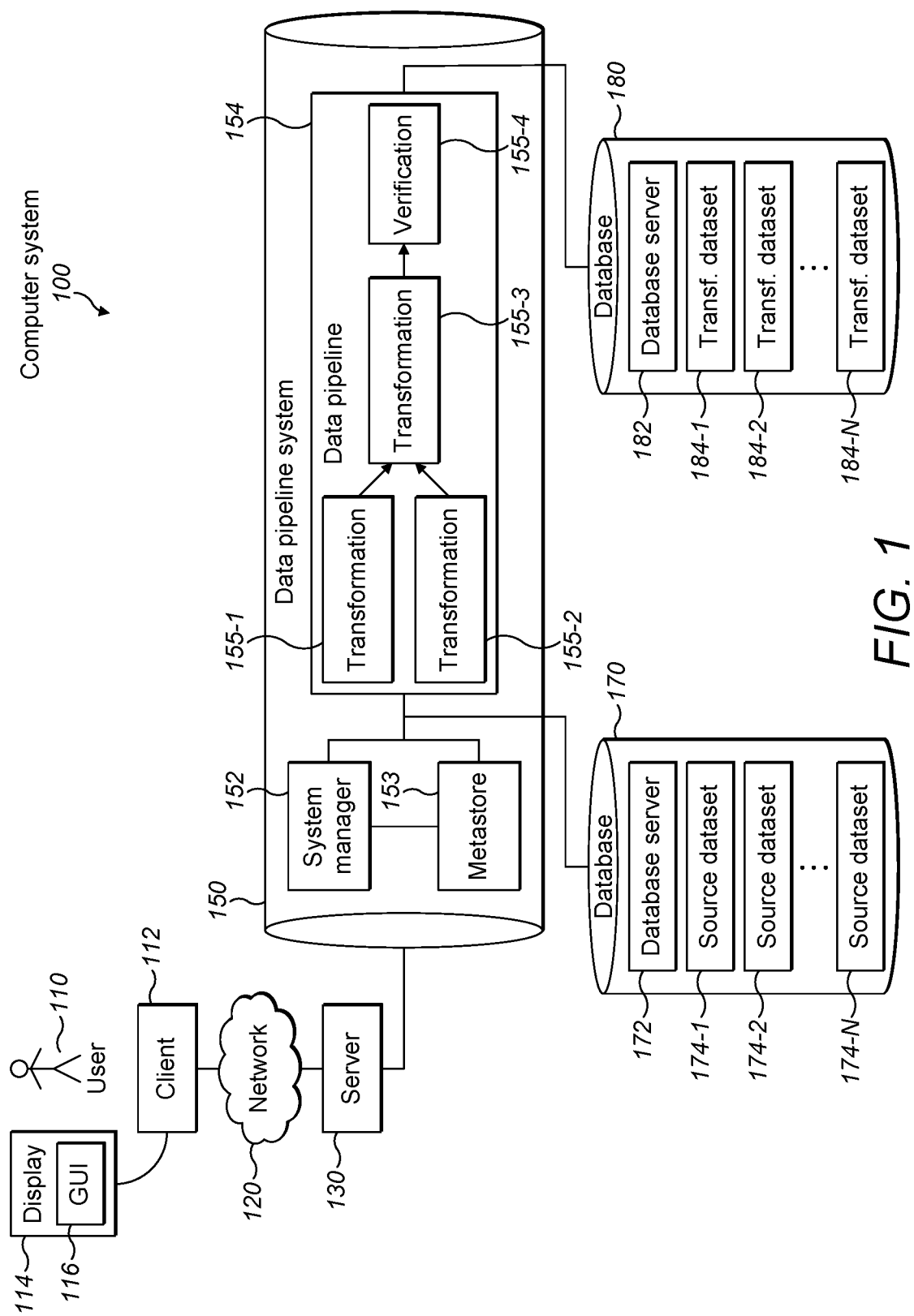
FIG. 1 represents an example computer system 100 which is configured to enforce data security constraints in a data pipeline.

The detailed description set forth below is intended as a description of various configurations of the subject innovations and is not intended to represent the only configurations in which the subject innovations may be practiced. The appended drawings are incorporated herein and constitute a part of the detailed description. The detailed description includes specific details for the purpose of providing a thorough understanding of the subject innovations. However, the subject innovations are not limited to the specific details set forth herein and may be practiced without these specific details. In some instances, some structures and components are shown in block diagram form in order to avoid obscuring the concepts of the subject innovations.

Data pipelines are often used in circumstances where there is a need to precisely control the content of the data released by the data pipeline. In particular, it may be desirable to ensure that data released by a pipeline satisfies a data security constraint—for example, that the released data is based only on a restricted subset of all the datasets available to the pipeline. This would for example be the case where a pipeline is used to release data from one facility to another, or from a first organisation to a second organisation, where it is important to order to avoid a 'data leak', that is, the unintended release of sensitive data.

Sensitive data may be introduced in the data released by a data pipeline as a result of various factors. For example, sensitive data may be present in datasets which should not contain sensitive data. Sensitive data may be held in columns of datasets that are released by a data pipeline without the columns first being dropped. Sensitive data may be held in rows which have particular values (e.g. a value that indicates that the row corresponds to an employee) and may be inadvertently introduced as a result of not filtering those rows out. Joins may further complicate the matter by re-introducing sensitive data in datasets which have already been correctly filtered out.

Conventional data pipeline systems usually cannot enforce data security constraints in a manner satisfactory for such purposes. Data pipeline systems are typically designed to have access to all the datasets in a database system. Moreover, data that may be released may be mixed with sensitive data within datasets. As such, it may not be possible to enforce such data security constraints by configuring the data pipeline system to only have access to certain datasets.

Solving these problems, the present disclosure provides for configuring a data pipeline using data defining one or more data security constraints, that is, restrictions defining what data may be released by the data pipeline. The data defining one or more data security constraints may define what data may be released by the data pipeline in terms of one or more datasets (e.g. datasets defining data object IDs that may or may not be released) and/or computer-readable instructions (e.g. filtering functions). The data defining one or more data security constraints is used to configure data transformation stages of the pipeline to filter the datasets on which they operate in order to satisfy the data security constraints, before performing the data transformations. The data defining one or more data security constraints are then also used to perform a verification on the transformed datasets to be released, to ensure that they satisfy the data security constraints. If a dataset to be released does not satisfy the data security constraints, release of the dataset may be blocked, and the user may be presented with an alert.

The present disclosure thus provides a user with the ability to control the data released by a data pipeline for compliance with data security constraints, in an automatic and efficient manner. Further beneficially, the present approach can seamlessly adapt to new data being added to the source datasets to keep enforcing the specified data security constraints. In addition, since the data defining the data security constraints may itself refer to datasets in order to define the data security constraints, the present approach can also control the data released by the data pipeline while automatically adapt to evolutions in any datasets defining the data security constraints.

Furthermore, the techniques of the present disclosure, besides being applicable in a new pipeline, may be applied to an existing pipeline by providing data defining one or more data security constraints and specifying a data transformation stage of the pipeline to be configured according to the data defining one or more data security constraints. Verification stages may then be automatically added to the pipeline, ensuring that the datasets to be released comply with the data security constraints. Beneficially, even when configuring a single data transformation stage of the pipeline using the data defining one or more data security constraints, some or all of the datasets to be released which depend on that data transformation stage may be verified for their compliance with the data security constraints, enabling not only data leaks to be blocked, but also their source (for example, in any intervening data transformation stages) to be ascertained more precisely.

FIG. 1 illustrates an example of a computer system 100 which is configured to enforce data security constraints in a data processing pipeline. As shown, the computer system 100 includes a client computing device 112 used by a human user 110, a server system 130, a data pipeline system 150, a file storage system 170 and a database 180. The client computing device 112 and the server system 130 may be configured to communicate with one another via a network 120. The network 120 may include the Internet, an intranet, a local area network, a wide area network, a wired network, a wireless network, and a virtual private network (VPN). For ease of understanding, various components of the system have each been described with reference to one or more computing devices. It should be noted that, in same embodiments, any number of these components may be collocated on the same computing device.

The client computing device 112 may for instance be a laptop computer, a desktop computer, a mobile phone, a personal digital assistant (PDA), a tablet computer, a netbook, a television with one or more processors, embedded therein or coupled thereto, a physical machine or a virtual machine. The client computing device 112 may include one or more of a keyboard, a mouse, a display 114, or a touch screen (of which the display 114 may be a part of). For example, the client computing device 112 may be composed of hardware components like those of basic computing device 700 described below with respect to FIG. 7. The client computing device 112 may also include a web browser or a client application configured to display, in a graphical user interface 116 of the display 114, a computer program for performing data processing pipelines. Such a computer program may allow the user to indicate the source datasets 174-1, 174-2, or 174-N to which pipeline stages should be applied and where the one or more transformed datasets 184-1, 184-2, or 184-N should be stored. It may also allow the user to specify other operations that should be performed by the data pipeline system 150. The graphical user interface 116 may be a web browser window, a client application window, an operating system window, an integrated development environment window, a virtual terminal window or other computer graphical user interface window. While only one user 110 and one client computing device 112 are illustrated in FIG. 1, the subject innovations may be implemented in conjunction with one or more users 110 and one or more client computing devices 112.

The server system 130 may include a data pipeline system control module which is capable of receiving instructions for a data processing pipeline from a client device 112 and requesting that the data pipeline system 150 perform the data processing pipeline. The server system 130 is advantageously implemented as multiple server computing devices arranged in a distributed or clustered computing arrangement. Each such server computing device may be composed of hardware components like those of basic computing device 700 described below with respect to FIG. 7.

The server system 130 may include one or more processors (e.g., CPUs), a network interface, and memory. The processor(s) may be configured to execute computer instructions that are stored in one or more computer-readable media, for example, the memory of the server system 130. The server system 130 may include a network interface that is configured to allow the server system 130 to transmit and receive data in a network, e.g., network 120 of FIG. 1. The network interface may include one or more network interface cards (NICs). The memory of the server system 130 may store data or instructions. The instructions stored in the memory may include the data pipeline system control module.

In this representative embodiment, the source datasets are contained and received from the database 170 and the transformed datasets are stored in the database 180. However, either or both of the source datasets 174-1, 174-2, or 174-N and the transformed datasets 184-1, 184-2, or 184-N may instead be present, retrieved from and/or stored to, any of the computing devices of the computer system 100. For example, the source datasets 174-1, 174-2, or 174-N may be present on and received from the database 180; for example, the databases 170 and 180 may be the same database. They may also be present on, retrieved from and/or stored to any computing device or storage medium accessible, directly or indirectly, by the data pipeline system 150.

The data pipeline system 150 includes a system manager 152, which is configured to apply data pipeline stages 155-1, 155-2, 155-3, and 155-4 to the source datasets 174-1, 174-2, or 174-N. The data pipeline system 150 also includes a metadata store 153 which stores metadata of the source datasets 174-1, 174-2, or 174-N and information to define the data pipeline stages 155-1, 155-2, 155-3, and 155-4 to be performed in the data pipeline 154. In particular, the metadata store may programmatically define the operations to be performed by each data pipeline stage 155-1, 155-2, 155-3, and 155-4 (for example, by way of one or more Python scripts). In addition, the metadata store 153 may store one or more datasets which are necessary for the configuration of the data pipeline 154. In this regard, the metadata store 153 may at least partially overlap with the database 170 and/or the database 180. Furthermore, some data stored in the metadata store 153 may pertain to the definition of one or more data security constraints, that is, restrictions defining what data may be released by the data pipeline, which may be defined in the form of data including datasets, data tables and/or code snippets such as filtering functions. Based on the information in the metadata store 153, the system manager 152 may provision and may run the data pipeline stages 155-1, 155-2, 155-3, and 155-4 as defined by the information in the metadata store 153.

The data pipeline system 150 includes a data pipeline 154, which performs a plurality of data pipeline stages 155-1, 155-2, 155-3, and 155-4. Each data pipeline stage 155-1, 155-2, 155-3, and 155-4 takes one or more datasets as input and performs some processing on it. A data pipeline stage may perform data transformations on their input datasets to produce one or more transformed datasets. For example, transformation stages may perform filtering operations, joins of several datasets, denoising operations, calculations of numerical indicators, compilation of statistics, etc. A pipeline stage may additionally or alternatively implement data verifications, such as by applying one or more tests to an input dataset and letting the input dataset through if the tests pass.

The data pipeline stages 155-1, 155-2, 155-3, and 155-4 may depend on one another, that is, the output of one stage can be used as the input of a subsequent stage, as shown in the example of FIG. 1. In this example, a first data transformation stage 155-1 and a second data transformation stage 155-2 are shown. A third data transformation 155-3 depends on the output of the first and second data transformation stages 155-1 and 155-2. Finally, a data verification stage 155-4 depends on the third data transformation 155-3. During operation, one or more source datasets are transformed by the first and second data transformations 155-1 and 155-2, and the resulting transformed datasets form the input for the third data transformation 155-3. This is transformed by the third data transformation 155-3, and the resulting transformed dataset forms the input dataset for the verification stage 155-4. The output dataset of the verification stage 155-4, if the tests pass, is the final product of the data pipeline 154.

When a data pipeline stage 155-1, 155-2, 155-3, or 155-4 fails to complete (e.g., if a test which it implements fails, or due to some computational error), it does not produce an output dataset, and any data pipeline stages which depend on its output may be prevented from running. Alternatively, in some implementations, if a data pipeline stage 155-1, 155-2, 155-3, or 155-4 fails to complete, data pipeline stages which depend on its output may be conditionally allowed to run or prevented from running, depending on a risk level of the data pipeline stage 155-1, 155-2, 155-3, or 155-4. Any data transformation stage may have a risk level associated with it; such a risk level may for example indicate that the data handled by the data transformation stage 155-1, 155-2, or 155-3 has a minor risk or high risk of being sensitive. If a data pipeline stage 155-1, 155-2, 155-3, or 155-4 fails to complete but has a 'minor risk' risk level, the data pipeline stages which depend on its output may be allowed to run, and optionally may have the permissions on their output datasets configured such as to prevent them from being communicated unless verified by a user.

The data pipeline system 150 may be implemented as a single server computing device or as multiple server computing devices arranged in a distributed or clustered computing arrangement. Each such server computing device may be composed of hardware components like those of basic computing device 700 described below with respect to FIG. 7.

The data pipeline system 150 may include one or more processors (e.g., CPUs), a network interface, and memory. The processor(s) may be configured to execute computer instructions that are stored in one or more computer-readable media, for example, the memory of the data pipeline system 150. The data pipeline system 150 may include a network interface that is configured to allow the data pipeline system 150 to transmit and receive data in a network, e.g., a network connecting the data pipeline system 150 and the database 170 and a network connecting the data pipeline system 150 to the database 180, which may be the same or different network as the network that connects the data pipeline system 150 and the database 170. The network interface may include one or more network interface cards (NICs).

The database 170 may include a database server module 172 for storing and retrieving database data including source datasets 174-1, 174-2, or 174-N. The database 170 may be implemented as a single server computing device or as multiple server computing devices arranged in a distributed or clustered computing arrangement. Each such server computing device may be composed of hardware components like those of basic computing device 700 described below with respect to FIG. 7.

The database 170 may include one or more processors (e.g., CPUs), a network interface, and memory. The processor(s) may be configured to execute computer instructions that are stored in one or more computer-readable media, for example, the memory of the database 170. The database 170 may include a network interface that is configured to allow the database 170 to transmit and receive data in one or more networks, e.g., a network connecting the server system 130 and the database 170 and a network connecting the data pipeline system 150 to the database 170, which may be the same or different network as the network that connects the server system 130 and the database 170. The network interface may include one or more network interface cards (NICs). The memory of the database 170 may store data or instructions. The instructions stored in the memory may include the database server module 172.

The source datasets 174-1, 174-2, or 174-N may be computer files of the same or different types. A dataset holds data within the transactional platform, and each data set may hold multiple data entries. Each dataset has a schema in order for sense to be made of the data entries within the dataset. The source datasets 174-1, 174-2, or 174-N may be tables of a database, or documents of a document-oriented database or objects of an objected-oriented database. The datasets may also be in-memory objects. It should be recognized that the types of the source datasets 174-1, 174-2, or 174-N are not limited to only one of the preceding categories and could be any number or combination of these categories. For example, some portion of the datasets could be files and some other portion could be database tables. Data entries could, for example, be entries in a database table, document or object.

The types of the transformed datasets 184-1, 184-2, or 184-N could be any number of the types specified above. In addition, a transformed dataset could be an encrypted or decrypted rendition of the corresponding input dataset or some portion of it.

Figure 2:
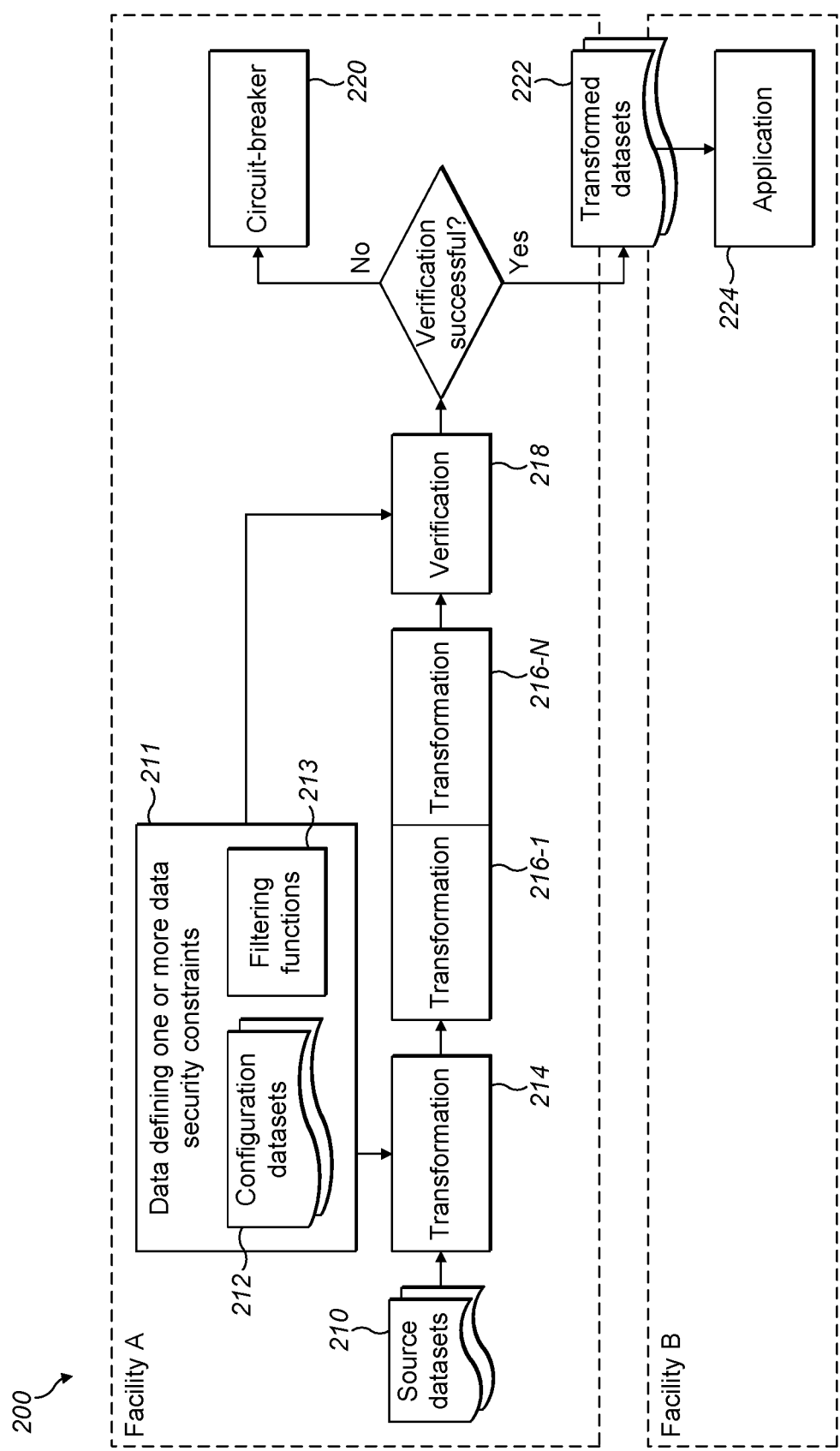
FIG. 2 shows an example data pipeline.

FIG. 2 shows an example data pipeline 200. For example, data pipeline 154 of FIG. 1 may be configured as shown for the data pipeline 200 of FIG. 2. This may for example be achieved by configuring metadata store 153 accordingly.

One or more source datasets 210 are accessible to the data pipeline 200. The source datasets 210 may be accessible through a database such as database 170 of FIG. 1. The source datasets 210 may comprise data which is sourced directly from sensors or user input, and may also comprise data which is the result of previous processing through a data pipeline. A source dataset 210 may be any source or store of data from which data may be retrieved, such as an output signal from a sensor, a database table, a spreadsheet table, a text file, an array, or a collection of objects.

Some of the source datasets 210 may comprise a mixture of sensitive data (which should not be released by the data pipeline) and non-sensitive data (which can be released by the data pipeline). In addition, the combined content of multiple ones of the source datasets 210 may be sensitive, even if their content taken individually is non-sensitive.

Accessible to the data pipeline system 150 is data defining one or more data security constraints 211, each associated with one or more transformation stages and/or verification stages of the pipeline 200 where they are to be applied, the data security constraints defining what data may be released by the data pipeline. The data defining one or more security constraints 211 may comprise one or more configuration datasets 212 which may be accessible to the data pipeline 200. The contents of the configuration datasets 212 may be used as criteria to define what data may be released by the data pipeline. The data defining one or more data security constraints 211 may also include one or more machine-readable instructions, such as filtering functions 213 which compute whether a dataset or data entry should be allowed for release. The data defining one or more security constraints 211 may thus provide a coherent specification that enables the data pipeline system to determine, for a dataset, which of its entries may not be released, which enables such entries both to be filtered out when performing transformations and to be identified when performing verifications.

Data pipeline 200 comprises a data transformation 214. The data transformation 214 may be any kind of data transformation, such as a filter, join, numerical transformation etc., and may process one or more source datasets 210 to generate a transformed dataset.

Data transformation 214 may be capable of being configured, using the data defining one or more data security constraints 211, to perform its transformation on a restricted subset of the data entries of the one or more source datasets 210. For example, the entries of the input datasets may be filtered according to any configuration datasets 212 and/or filtering functions 213, prior to performing the transformation.

Data pipeline 200 may further comprise additional data transformations 216-1 to 216-N, which may optionally follow data transformation 214 and may further transform the transformed dataset output by data transformation 214. Like data transformation 214, some of the data transformations 216-1 to 216-N may themselves be capable of being configured, using the data defining one or more data security constraints 211, to perform their transformations on a restricted subset of data entries, for example, by apply a filtering operation before the data transformation. Each data transformations may be configured using by a corresponding portion of the data stored in the metadata store 211 (e.g. a corresponding set of one or more configuration datasets 212 and/or filtering functions 213).

Data pipeline 200 comprises a verification stage 218, which is configured to perform one or more verifications on a dataset, which may more particularly be a dataset to be released. The dataset on which verifications are performed may be the transformed dataset output by data transformation 214, or a transformed dataset output by one of the subsequent data transformations 216-1 to 216-N. Moreover, data pipeline 200 may be configured to construct verification stages for datasets which depend on the output of data transformation 214 in particular ways, such as datasets which are obtained by performing a join of the output of data transformation 214 with another dataset.

Verification stage 218 may be capable of being configured, using the data defining one or more data security constraints 211, to verify that the dataset to be released satisfies the data security constraints. In particular, configuration datasets 212 and/or filtering functions 213 which are used to configure verification stage 218 may be one or more of those which are used to configure data transformations used to generate the dataset to be released, such that the same configuration datasets may be used to configure both transformation stages and verification stages of the pipeline, automatically providing consistency between transformations and verifications without user intervention.

In some embodiments, verification stage 218 may be applied to all the intermediate transformed datasets generated by data transformations 214 and 216-1 to 216-N. In such a manner, if data which should not be released is introduced in the transformed dataset at any point in the pipeline, the precise point at which this data is introduced may be ascertained.

The data defining one or more data security constraints 211 may be used to configure verification stage 218 to check whether the dataset to be released perfectly satisfies constraints as defined, for example, by configuration datasets 212 and/or filtering functions 213. Alternatively, the data defining one or more data security constraints 211 may configure verification stage 218 to check that at least a threshold proportion of the data entries in the dataset to be released satisfy the constraints as defined by configuration datasets 212 and/or filtering functions 213, and succeed if the proportion of the data entries in the dataset to be released which satisfy the data security constraints exceeds the threshold proportion.

Data pipeline 200 comprises a circuit-breaker 220, which can block release of the dataset if the verification stage 218 indicates that the dataset to be released does not satisfy the data security constraints. Circuit-breaker 220 may also provide an alert to a user if the dataset to be released does not satisfy the data security constraints. By providing such an alert, a user may be able to analyse how the data that does not satisfy the data security constraints was introduced, and therefore identify errors in the programming of the pipeline. Such an alert may also enable a user to identify unexpected changes in one or more of the source databases 210; for example, changes which result in sensitive data being inadvertently introduced in the one or more source databases 210.

In some embodiments, circuit-breaker 220 may be implemented as part of the verification stage 218. For example, verification stage 218 may be configured as a pipeline stage which does not apply any transformation to its input dataset, simply letting it through as the output dataset, but fails to build the output dataset if the verification checks fail.

Data pipeline 200 also comprises means for transferring the verified transformed datasets 222 to a separate facility or organisation if they satisfy the data security constraints. These may then be ingested by an application 224 of the separate facility or organisation.

Where multiple datasets are to be released, multiple verification stages may be provided in data pipeline 200, one for each dataset to be released. Moreover, a first dataset to be released, once verified, may itself be used as a configuration dataset for a second dataset to be released. In such a situation, it may be automatically determined that the second dataset needs to be verified for compliance with respect to the first dataset, which is a configuration dataset for the second dataset, but not with respect to the data security constraints used to verify the first dataset. In this manner, the computational load of performing verifications may be kept low where multiple interdependent datasets are to be released.

Furthermore, the ability to define data security constraints in terms of configuration datasets, combined with the ability to use any dataset as a configuration dataset, provides improved adaptability to changes in the database as new data is introduced without requiring large amounts of user intervention to manually update the data defining one or more data security constraints. Indeed, a single update to a first configuration dataset may enable generating and verifying of multiple datasets which in turn may be used as configuration datasets for generating and verifying further datasets.

The data defining one or more data security constraints 211 may define one or more restrictions on the data entries of a dataset which may be allowed for release. In particular, each data security constraint may act as a filter which can designate a subset of the entries of a dataset, to be allowed for release. Such filters can be implemented, for example, by configuration datasets and/or filtering functions.

In particular, a filter applied by a configuration dataset may be defined in various different ways:

A configuration dataset may specify a set of values for a certain field or for entries of a certain type. In such an example, only data entries with the field or type taking one of the listed values may be allowed for release.

For example, the configuration dataset may specify a set of IDs which are allowable. For example, the configuration dataset may hold a list of IDs which are primary and/or foreign keys of a dataset to which the data security constraint is applied.

Moreover, a configuration dataset may specify a set of allowable combinations of values for multiple fields, in which case the fields of a data entry must correspond to one of the allowable combinations in order to be allowed.

A configuration dataset may define a set of one or more allowable columns or fields. All columns or fields other than those specified may then be filtered out or rejected for release when the security constraint is applied.

Furthermore, such filters can be combined using operators, such as the logical operators NOT, OR, AND, XOR, as well as using conditional statements, to designate the subset of entries allowed for release.

For example, where the configuration dataset lists a set of IDs, such a list may be combined with the NOT operator such that the list of IDs designates IDs to be rejected.

As another example, filters may be combined using conditional statements, such as "if the value of column 1 takes one of the values in list 1, then the value of column 2 must take one of the values in list 2 in order for the data entry to be allowed".

In addition, a configuration dataset may specify one or more patterns, such as patterns defined by a regular expression ("regex"). All fields not matching the patterns may then be filtered out or rejected for release when the security constraint is applied. For example, a configuration dataset may specify a pattern requiring all phone numbers in a contact information column to start with '+44'.

A filtering function may also define a filter in various ways:

For example, a filtering function may filter a dataset for values which are within a tolerance of a particular value.

A filtering function may perform complex computations in order to determine whether a data entry or dataset may be released. For example: 'the column current_measurement needs to be NULL if current_state is Not_Ok'.

A filtering function may also compare a dataset's fields to the fields of one or more source datasets and/or configuration datasets, using a comparison operator, and filter the dataset's fields based on the comparison.

Filtering functions may also be combined with each other and with configuration datasets using logical and programmatic operators.

A more detailed example of the pipeline architecture 200 is now explained with reference to FIGS. 3 and 4.

Figure 3:
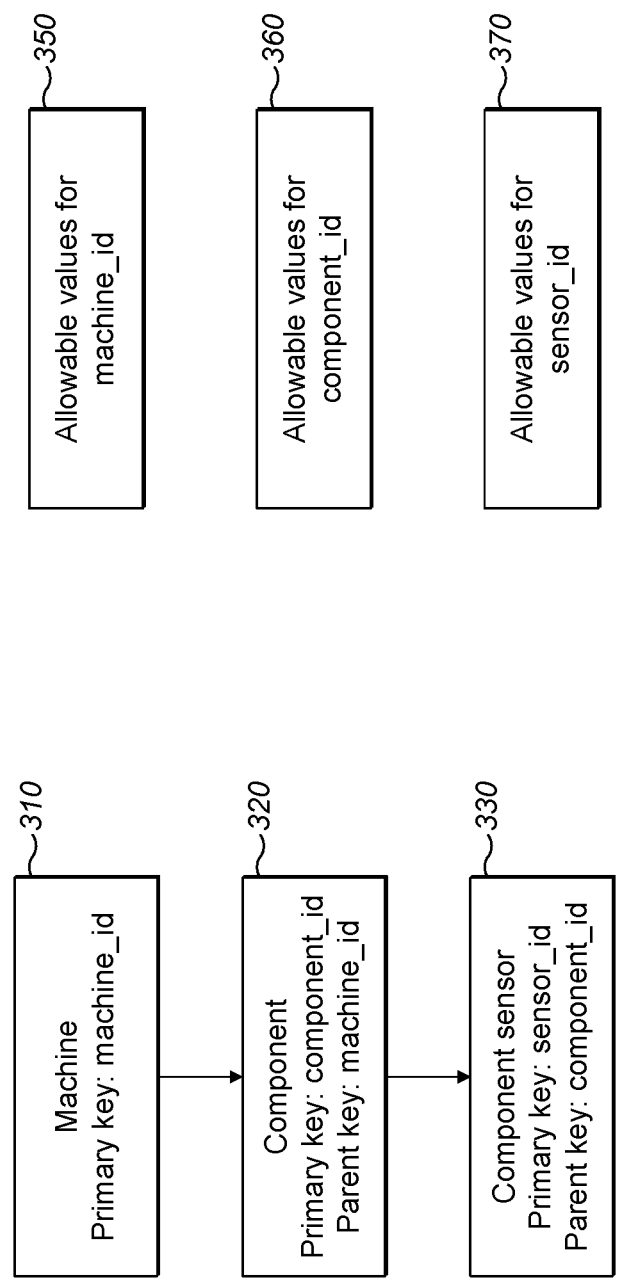
FIG. 3 shows example source datasets and configuration datasets.

FIG. 3 shows example source datasets 310-330 encoding sensor data obtained from machines. Source datasets 310-330 are implementations of source datasets 212 of FIG. 2. Dataset 310 is a table named 'Machine' with a column 'machine_id' as a primary key. Dataset 320 is a table named 'Component' with a column 'component_id' as a primary key and a column 'machine_id' as a foreign key, referring to column 'machine_id' of table Machine. Dataset 33o is a table named 'Component sensor' with a column 'sensor_id' as a primary key and a column 'component_id' as a foreign key, referring to column 'component_id' of table Component.

FIG. 3 also shows example configuration datasets 350-370. Configuration datasets 350-370 are implementations of configuration datasets 212 of FIG. 2. Configuration dataset 350 is a list of values of "machine_id" for which the data in the source datasets may be released. Configuration dataset 360 is a list of values of "component_id" for which the data in the source datasets may be released. Configuration dataset 370 is a list of values of "sensor_id" keys for which the data in the source datasets may be released.

Figure 4:
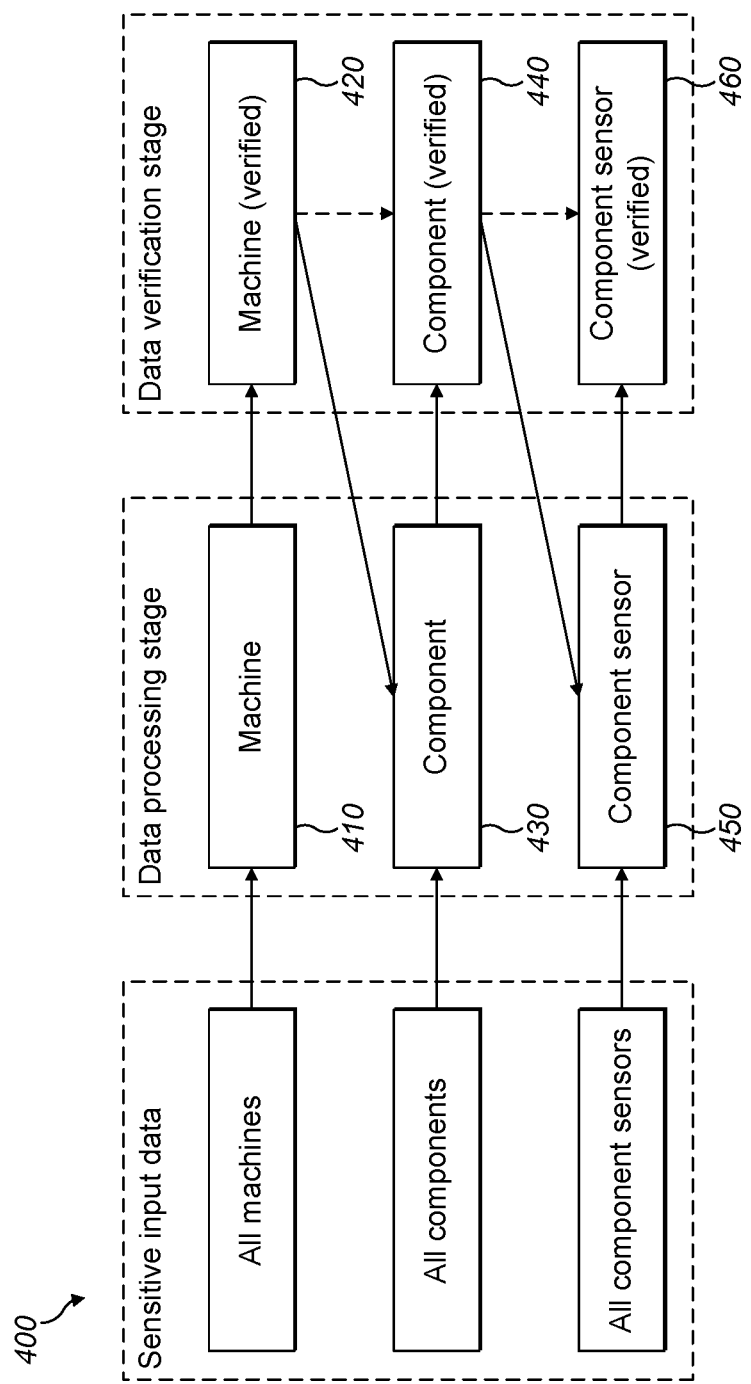
FIG. 4 shows a more detailed example of the data pipeline of FIG. 2.

FIG. 4 shows an example pipeline 400 for releasing the data entries in tables 310-33o which satisfy the data security constraints defined by configuration datasets 350-370. Pipeline 400 is an implementation of pipeline 200 of FIG. 2.

A first, transformation, stage of pipeline 400 filters the entries of source dataset 310 (Machine) which correspond to the values listed in configuration dataset 350, yielding a transformed dataset 410. A second, verification, stage of pipeline 400 verifies that the values in the transformed dataset 410 satisfy the data security constraints of configuration dataset 350, yielding a verified dataset 420, "Machine (verified)". The second verification stage may be configured such that if the verification passes, the verified dataset 420 is released, and otherwise, the processing of the pipeline is halted and an alert is provided.

A third, transformation, stage of pipeline 400 is configured using configuration dataset 360 and the "Machine (verified)" dataset 420, to filter the entries of source dataset 320 (Component) such that every "machine_id" field of a filtered entry is in the "Machine (verified)" dataset 420 and every "component_id" field of a filtered entry is in the configuration dataset 360. As such, the "Machine (verified)" dataset is used as a configuration dataset of the third transformation stage. The third transformation stage may generate a transformed dataset 430. A fourth, verification, stage of pipeline 400 verifies that every entry in the transformed dataset 430 corresponds to the configuration datasets 360 and 420, yielding a verified dataset 440, "Component (verified)". Because the compliance of the transformed dataset 430 with the verified dataset 420, "Machines (verified)" is verified, it may be automatically determined that the transformed dataset 430 does not need to be verified with respect to the configuration dataset 350 (which listed a set of machine ids), even though transformation 410, which enabled the transformed dataset 430 to be generated, was configured using the configuration dataset 350. The fourth verification stage may be configured such that if the verification passes, the verified dataset 440 is released, and otherwise, the processing of the pipeline is halted and an alert is provided.

A fifth, transformation, stage of the pipeline 400 is configured using configuration dataset 370 and the "Component (verified)" dataset 440, to filter the entries of source dataset 330 (Component sensor) such that every "component_id" field of a filtered entry is in the "Component (verified)" dataset 440 and every "sensor_id" field of a filtered entry is in the configuration dataset 370. As such, the "Component (verified)" dataset is used as a configuration dataset of the fifth transformation stage. The fifth transformation stage may generate a transformed dataset 450. A sixth, verification, stage of the pipeline 400 verifies that every entry in the transformed dataset 450 corresponds to the configuration datasets 370 and 440, yielding a verified dataset 460, "Component sensor (verified)". Because the compliance of the transformed dataset 450 with the verified dataset 440, "Components (verified)" is verified, it may be automatically determined that the transformed dataset 450 does not need to be verified with respect to either the configuration dataset 350, the configuration dataset 360, or the verified dataset 420, "Machines (verified)", even though some of the transformations which enabled transformed dataset 450 to be generated were configured using these datasets. The sixth verification stage may be configured such that if the verification passes, the verified dataset 460 is released, and otherwise, the processing of the pipeline is halted and an alert is provided.

Figure 5:
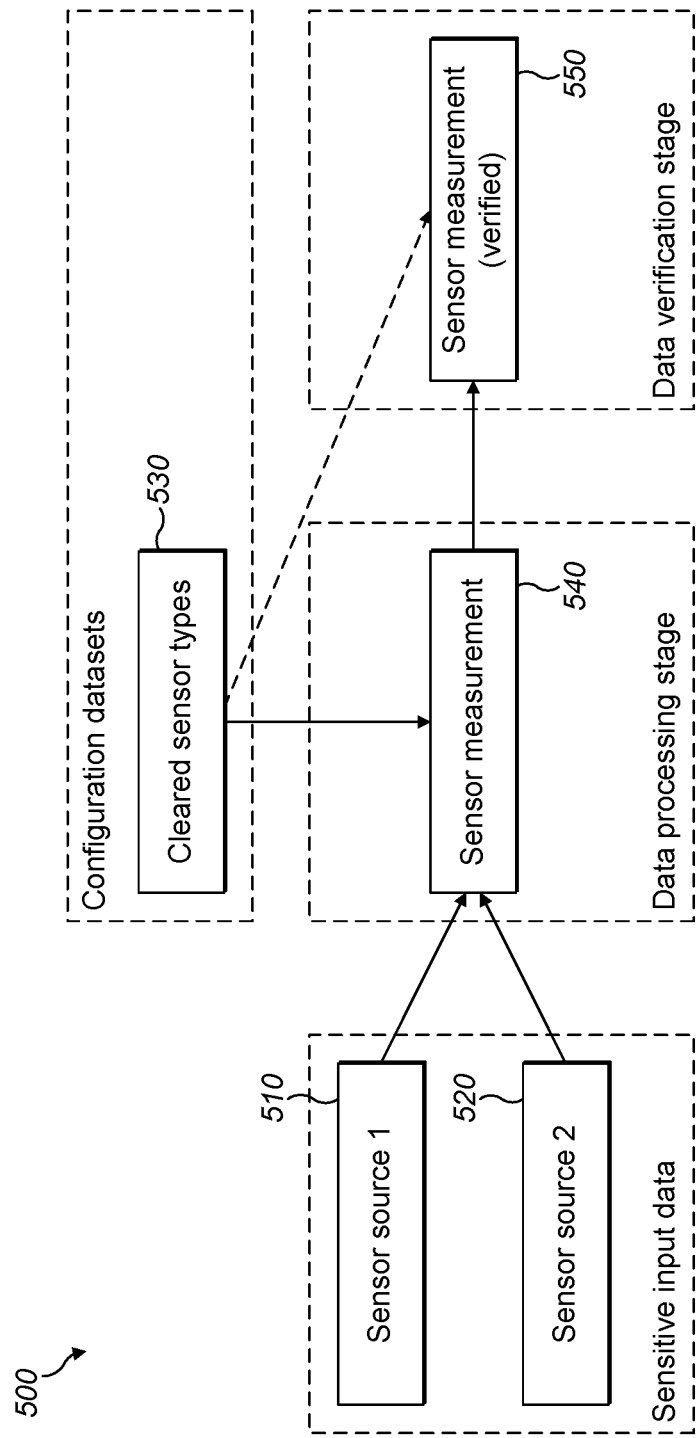
FIG. 5 shows another more detailed example of the data pipeline of FIG. 2.

Another more detailed example of the pipeline architecture 200 is now explained with reference to FIG. 5. FIG. 5 shows an example pipeline 500 for releasing the data entries in source datasets 510-52o which satisfy the data security constraints defined by configuration dataset 530. Pipeline 500 is an implementation of pipeline 200 of FIG. 2.

Source datasets 510 and 520 are both tables of sensor measurement entries, each row of the table defining a type of the sensor which carried out the measurement and the data of the measurement.

Pipeline 500 comprises a transformation stage, which concatenates the data entries of source datasets 510 and 520 to provide a table 540 of sensor measurements. The transformation stage is configured using configuration dataset 530, which is a list of sensor types for which the sensor data may be released, thus defining a data security constraint. The transformation stage is configured to filter the entries of datasets 510 and 520 to those which match the sensor types listed in the configuration dataset 530, before concatenating them.

Furthermore, pipeline 500 comprises a verification stage, which verifies that the transformed dataset 540 satisfies the data security constraints. The verification stage may be configured such that if the verification passes, the verified dataset 550 is released, and otherwise, the processing of the pipeline is halted and an alert is provided. In this manner, the data security constraints of configuration dataset 530 can be enforced.

Figure 6:
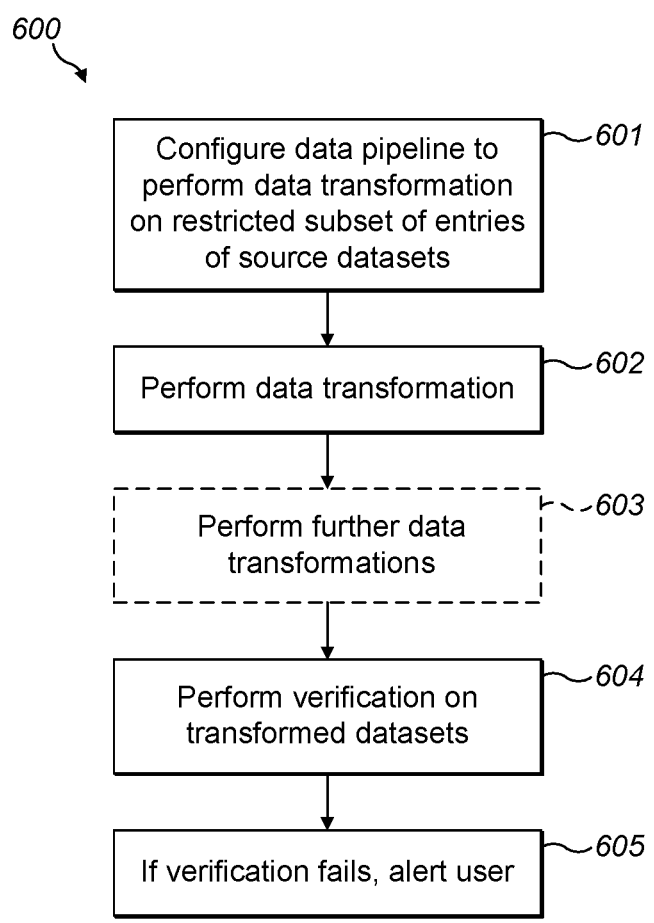
FIG. 6 shows a computer-implemented method for enforcing a data security constraint in a data pipeline implemented by a data pipeline system.

FIG. 6 shows a computer-implemented method 600 for enforcing a data security constraint in a data pipeline implemented by a data pipeline system, such as data pipeline 154 implemented by data pipeline system of FIG. 1. The pipeline system may have access to one or more source datasets. The data pipeline may be pre-existent, and may be configured to perform one or more data transformations on the source datasets to generate one or more transformed datasets.

At step 601, data defining one or more data security constraints may be used to configure a data transformation of the data pipeline, such that the data transformation is performed on a restricted subset of entries of the one or more source datasets.

The data security constraints may be defined, for example, using a dataset (e.g., a configuration dataset) and/or code (e.g., one or more filtering functions). A configuration dataset may be any dataset to which the pipeline system has access, and may define a filtering operation which can determine, for each data entry in a dataset, whether the data entry may be released or not. In this manner, a configuration dataset may define a data security constraint. A configuration dataset may be obtained using any means, including through user input. A filtering function may be any function which may indicate, for each data entry in a dataset, or for an entire dataset, whether the data entry and/or dataset may be released or not. A filtering function may be obtained using any means, including through user input.

The data transformation which is configured may be any data transformation of the data pipeline. In particular, the data transformation may be pre-existent, and may be manually selected by a user for being configured with the configuration dataset, for example using a graphical user interface.

Configuring the data transformation at step 601 may for example involve configuring the data transformation to only perform the data transformation on those entries of the source datasets which are allowed to be released according to the data security constraints. In this manner, the data transformation may be modified such that its output will satisfy the data security constraints, e.g. data security constraints defined by configuration datasets and/or filtering functions.

At step 602, the data transformation may be performed, yielding one or more transformed datasets. These transformed datasets may thus satisfy the data security constraints.

At step 603, one or more further data transformations may optionally be performed, taking the one or more transformed datasets obtained at step 602 as input. Such data transformations may be pre-existent data transformations of the data pipeline which depend on the data transformation configured at step 602. As such, the further data transformations may potentially re-introduce data which, according to the data defining the data security constraints, should not be released, and was already filtered out at step 602.

At step 604, a verification is performed on one or more of the transformed datasets, to verify whether the entries in the one or more transformed datasets are restricted as defined by the data defining the data security constraints. In particular, the verification may be performed on a transformed dataset which is to be released. For example, the verification may be performed on some or all of the transformed datasets which are to be released and which depend on the data transformation for being generated. Additionally or alternatively, the verification may be performed on any of the transformed datasets output by the further data transformations of step 603.

At step 605, if the verification fails, an alert may be provided to a user, indicating that one or more of the transformed datasets comprises data entries which do not satisfy the data security constraint defined by the configuration dataset. The alert may indicate which of the transformed dataset does not satisfy the data security constraints. Alternatively or additionally, the release of a transformed datasets which failed the verification may be blocked, thus ensuring data security as specified by the data defining data security constraints.

It will be noted that steps 601-605 may be performed entirely automatically subsequent to a user specifying data defining one or more data security constraints (e.g. one or more configuration datasets and/or one or more filtering functions) and a data transformation to configure at step 601, thus providing consistent and highly automated enforcement of user-specified data security rules.

Moreover, method 600 provides particular benefits when applied to an existing data pipeline, in that configuring a single data transformation using data defining one or more data security constraints may ensure that the released data satisfies the data security constraints, even though other data transformations may not necessarily be configured using data defining data security constraints. Moreover, configuring a single data transformation may enable any subsequent data transformations which re-introduce data which should not be released to be easily identified.

Figure 7:
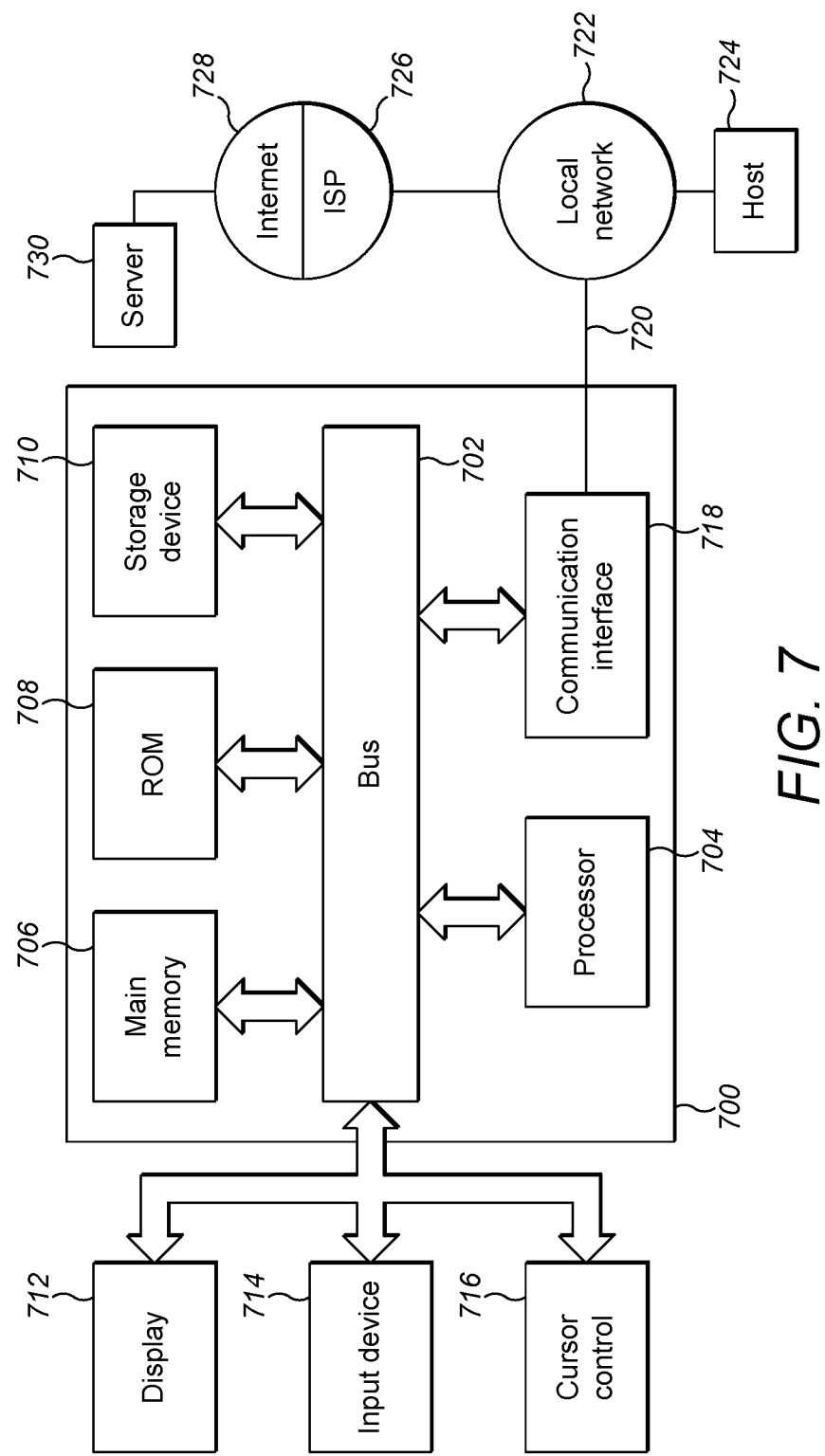
FIG. 7 shows a computing device.

Referring now to FIG. 7, it is a block diagram that illustrates a basic computing device 700 in which software-implemented processes of the subject innovations may be embodied. Computing device 700 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 700 may include a bus 702 or other communication mechanism for addressing main memory 706 and for transferring data between and among the various components of device 700.

Computing device 700 may also include one or more hardware processors 704 coupled with bus 702 for processing information. A hardware processor 704 may be a general purpose microprocessor, a system on a chip (SoC), or other processor suitable for implementing the subject innovations.

Main memory 706, such as a random access memory (RAM) or other dynamic storage device, also may be coupled to bus 702 for storing information and instructions to be executed by processor(s) 704. Main memory 706 also may be used for storing temporary variables or other intermediate information during execution of software instructions to be executed by processor(s) 704.

Such software instructions, when stored in non-transitory storage media accessible to processor(s) 704, render computing device 700 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 700 also may include read only memory (ROM) 708 or other static storage device coupled to bus 702 for storing static information and instructions for processor(s) 704.

One or more mass storage devices 710 may be coupled to bus 702 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 710 (e.g., the main hard disk for the device) stores a body of program and data for directing operation of the computing device, including an operating system, user application programs, driver and other support files, as well as other data files of all sorts.

Computing device 700 may be coupled via bus 702 to display 712, such as a liquid crystal display (LCD) or other electronic visual display, for displaying information to a computer user. In some configurations, a touch sensitive surface incorporating touch detection technology (e.g., resistive, capacitive, etc.) may be overlaid on display 712 to form a touch sensitive display for communicating touch gesture (e.g., finger or stylus) input to processor(s) 704.

An input device 714, including alphanumeric and other keys, may be coupled to bus 702 for communicating information and command selections to processor 704. In addition to or instead of alphanumeric and other keys, input device 714 may include one or more physical buttons or switches such as, for example, a power (on/off) button, a "home" button, volume control buttons, or the like.

Another type of user input device may be a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

While in some configurations, such as the configuration depicted in FIG. 7, one or more of display 712, input device 714, and cursor control 716 are external components (i.e., peripheral devices) of computing device 700, some or all of display 712, input device 714, and cursor control 716 are integrated as part of the form factor of computing device 700 in other configurations.

Functions of the disclosed systems, methods, and modules may be performed by computing device 700 in response to processor(s) 704 executing one or more programs of software instructions contained in main memory 706. Such instructions may be read into main memory 706 from another storage medium, such as storage device(s) 710. Execution of the software program instructions contained in main memory 706 cause processor(s) 704 to perform the functions of the disclosed systems, methods, and modules.

While in some implementations, functions of the disclosed systems and methods are implemented entirely with software instructions, hard-wired or programmable circuitry of computing device 700 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor(s) 704 for execution. For example, the instructions may initially be carried on a magnetic disk or solid-state drive of a remote computer. The remote computer can load the instructions into its dynamic memory and send the instructions over a telephone line using a modem. A modem local to computing device 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor(s) 704 retrieves and executes the instructions. The instructions received by main memory 706 may optionally be stored on storage device(s) 710 either before or after execution by processor(s) 704.

Computing device 700 also may include one or more communication interface(s) 718 coupled to bus 702. A communication interface 718 provides a two-way data communication coupling to a wired or wireless network link 720 that is connected to a local network 722 (e.g., Ethernet network, Wireless Local Area Network, cellular phone network, Bluetooth wireless network, or the like). Communication interface 718 sends and receives electrical, electromagnetic, or optical signals that carry digital data streams representing various types of information. For example, communication interface 718 may be a wired network interface card, a wireless network interface card with an integrated radio antenna, or a modem (e.g., ISDN, DSL, or cable modem).

Network link(s) 720 typically provide data communication through one or more networks to other data devices. For example, a network link 720 may provide a connection through a local network 722 to a host computer 724 or to data equipment operated by an Internet Service Provider (ISP) 726. ISP 726 in turn provides data communication services through the world wide packet data communication network now commonly referred to as the "Internet" 728. Local network(s) 722 and Internet 728 use electrical, electromagnetic or optical signals that carry digital data streams. The signals through the various networks and the signals on network link(s) 720 and through communication interface(s) 718, which carry the digital data to and from computing device 700, are example forms of transmission media.

Computing device 700 can send messages and receive data, including program code, through the network(s), network link(s) 720 and communication interface(s) 718. In the Internet example, a server 730 might transmit a requested code for an application program through Internet 728, ISP 726, local network(s) 722 and communication interface(s) 718.

The received code may be executed by processor 704 as it is received, and/or stored in storage device 710, or other non-volatile storage for later execution.

The above-described basic computer hardware is presented for purpose of illustrating the basic underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these embodiments will be readily apparent, and the generic principles defined herein may be applied to other embodiments. Thus, the claims are not intended to be limited to the embodiments shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

What is claimed is:

1. A computer-implemented method for enforcing data security constraints in a data pipeline, wherein the data pipeline takes one or more source datasets as input and performs one or more data transformations on them, the method comprising:

within a first stage of the data pipeline, generate a first transformed dataset by performing a first data transformation on a first subset of entries of the one or more source datasets, wherein the first subset is defined according to one or more first data security constraints, wherein the one or more first data security constraints are associated with one or more columns or rows, and wherein an entry is accepted into or rejected from the first transformed dataset based on a comparison between the entry and the one or more first data security constraints;

within a second stage of the data pipeline, generate a second transformed dataset by performing a second data transformation on a second subset of entries of the one or more source datasets;

validate the second transformed dataset according to a pattern or constraint specified by the first transformed dataset, wherein the validating comprises comparing entries of the second transformed dataset against the first transformed dataset and filtering out any fields of the second transformed dataset that fail to conform to the pattern or constraint specified by the first transformed dataset, the first transformed dataset specifying a previously unknown or undefined criteria; and providing an alert if any fields of the second transformed dataset fail to conform to the pattern.

2. The method of claim 1, further comprising, prior to the first stage:

obtaining, from a user, data defining the first data security constraints to be applied to the first data transformation.

3. The method of claim 1, wherein the one or more first data security constraints defines one or more conditions based on which the entry or a different entry in the one or more source datasets is either accepted or rejected for inclusion in the first subset of entries according to the one or more first data security constraints.

4. The method of claim 3, wherein the one or more first data security constraints defines one or more acceptable values for entries of a certain type, and wherein the entry is accepted or rejected based on whether the entry matches the one or more acceptable values.

5. The method of claim 1, wherein the first data transformation is a pre-existent data transformation of the data pipeline.

6. The method of claim 1, wherein the second subset of entries of the one or more source datasets is defined according to one or more second data security constraints; and the validating of the second transformed dataset is based on the one or more second data security constraints.

7. The method of claim 6, further comprising validating the first transformed dataset; and in response to the first transformed dataset being successfully validated, refraining from using the first data security constraints to perform the validation on the second transformed dataset.

8. The method of claim 7, further comprising:

communicating the second transformed dataset to an external entity if the validation of the second transformed dataset is successful.

9. The method of claim 1, wherein the second transformed dataset is released if the validation of the second transformed dataset is successful.

10. The method of claim 1, further comprising:

preventing communication of the second transformed dataset if the validation fails.

11. The method of claim 1, further comprising:

communicating the second transformed dataset to an external entity if the validation succeeds.

12. The method of claim 1, wherein the second subset of entries reference at least a portion of the first subset of entries as a foreign key.

13. The method of claim 1, further comprising receiving an update to the first transformed dataset; and validating the second transformed dataset or a third transformed dataset according to a second pattern of the updated first transformed dataset.

14. A data processing system configured to enforce data security constraints in a data pipeline, wherein the data pipeline takes one or more source datasets as input and performs one or more data transformations on them, the data processing system including one or more processors and instructions that, when executed by the one or more processors, cause the data processing system to perform:

within a first stage of the data pipeline, generate a first transformed dataset by performing a first data transformation on a first subset of entries of the one or more source datasets, wherein the first subset is defined according to one or more first data security constraints, wherein the one or more first data security constraints are associated with one or more columns or rows, and wherein an entry is accepted into or rejected from the first transformed dataset based on a comparison between the entry and the one or more first data security constraints;

within a second stage of the data pipeline, generate a second transformed dataset by performing a second data transformation on a second subset of entries of the one or more source datasets;

validate the second transformed dataset according to a pattern or constraint specified by the first transformed dataset, wherein the validating comprises comparing entries of the second transformed dataset against the first transformed dataset and filtering out any fields of the second transformed dataset that fail to conform to the pattern or constraint specified by the first transformed dataset, the first transformed dataset specifying a previously unknown or undefined criteria; and providing an alert if any fields of the second transformed dataset fail to conform to the pattern.

15. The data processing system of claim 14, wherein the instructions further cause the data processing system to perform:

prior to the first stage:

obtaining, from a user, data defining the first data security constraints to be applied to the first data transformation.

16. The data processing system of claim 14, wherein the one or more first data security constraints defines one or more conditions based on which the entry or a different entry in the one or more source datasets is either accepted or rejected for inclusion in the first subset of entries according to the one or more first data security constraints.

17. The data processing system of claim 16, wherein the one or more first data security constraints defines one or more acceptable values for entries of a certain type, and wherein the entry is accepted or rejected based on whether the entry matches the one or more acceptable values.

18. A non-transitory computer readable medium comprising instructions that, when executed, cause one or more processors to perform:

within a first stage of the data pipeline, generate a first transformed dataset by performing a first data transformation on a first subset of entries of the one or more source datasets, wherein the first subset is defined according to one or more first data security constraints, wherein the one or more first data security constraints are associated with one or more columns or rows, and wherein an entry is accepted into or rejected from the first transformed dataset based on a comparison between the entry and the one or more first data security constraints;

within a second stage of the data pipeline, generate a second transformed dataset by performing a second data transformation on a second subset of entries of the one or more source datasets;

validate the second transformed dataset according to a pattern or constraint specified by the first transformed dataset, wherein the validating comprises comparing entries of the second transformed dataset against the first transformed dataset and filtering out any fields of the second transformed dataset that fail to conform to the pattern or constraint specified by the first transformed dataset, the first transformed dataset specifying a previously unknown or undefined criteria; and providing an alert if any fields of the second transformed dataset fail to conform to the pattern.

* * * * *